S. L. SMITH.
TRAP NEST.
APPLICATION FILED MAR. 13, 1911.

1,004,702.

Patented Oct. 3, 1911.

2 SHEETS—SHEET 1.

Witnesses

Inventor
Samuel L. Smith
By
Attorneys

COLUMBIA PLANOGRAPH CO., WASHINGTON, D. C.

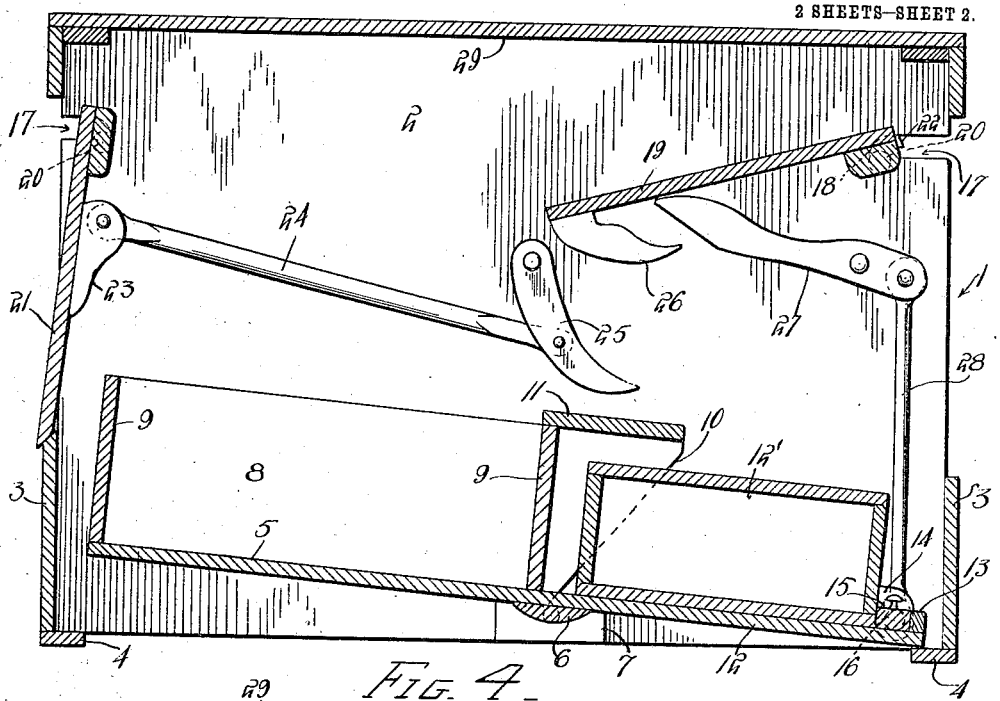
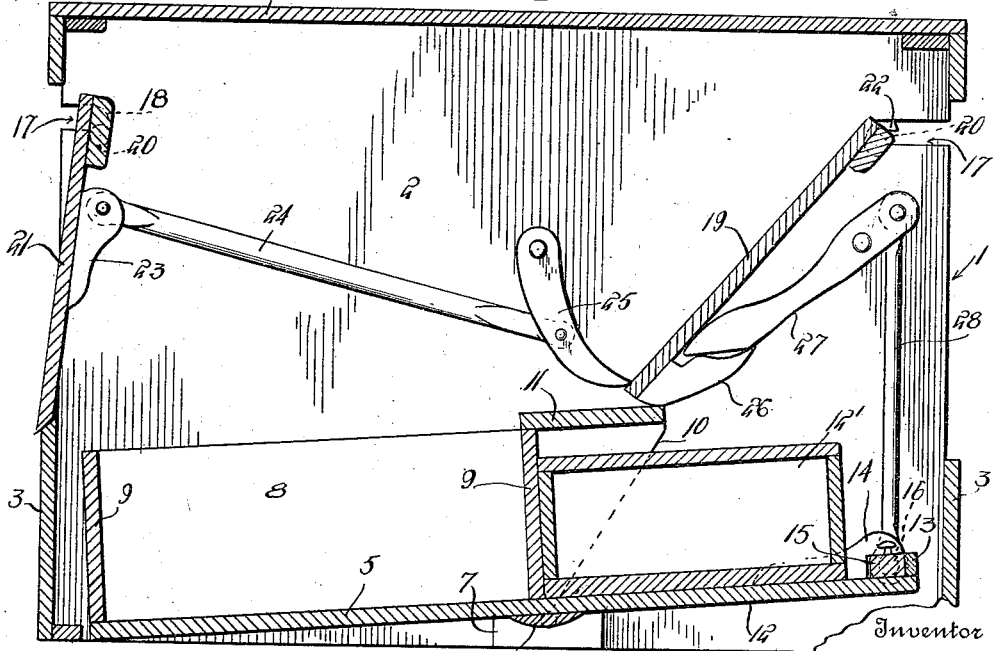
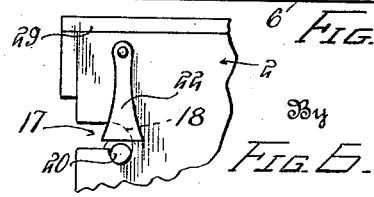

UNITED STATES PATENT OFFICE.

SAMUEL L. SMITH, OF DULUTH, MINNESOTA.

TRAP-NEST.

1,004,702.  Specification of Letters Patent.  Patented Oct. 3, 1911.

Application filed March 13, 1911. Serial No. 614,071.

*To all whom it may concern:*

Be it known that I, SAMUEL L. SMITH, a citizen of the United States, residing at Duluth, in the county of St. Louis, State of Minnesota, have invented certain new and useful Improvements in Trap-Nests; and I do hereby declare the following to be a full, clear, and exact description of the invention, such as will enable others skilled in the art to which it appertains to make and use the same.

This invention relates to devices commonly known as trap nests.

The invention has for its object to provide a device of this character in which a hen may enter at one end and upon leaving the nest at the opposite end, the entrance opening of the nest will assume a position that will allow another hen to enter the nest.

A further object of the invention is to produce an article of this character which may be easily and quickly taken apart for cleaning.

Figure 1:
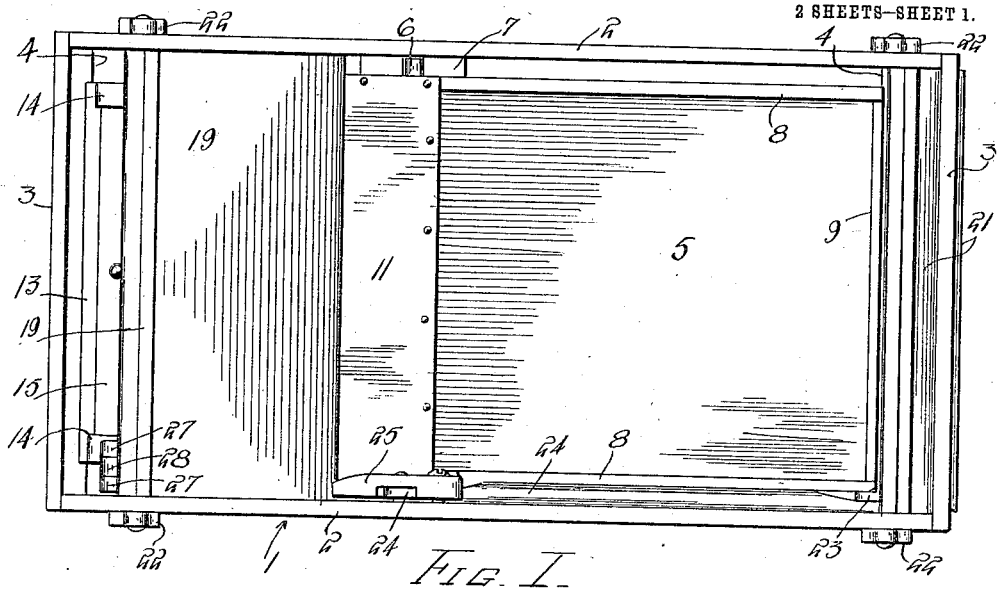
Figures 2, 3:
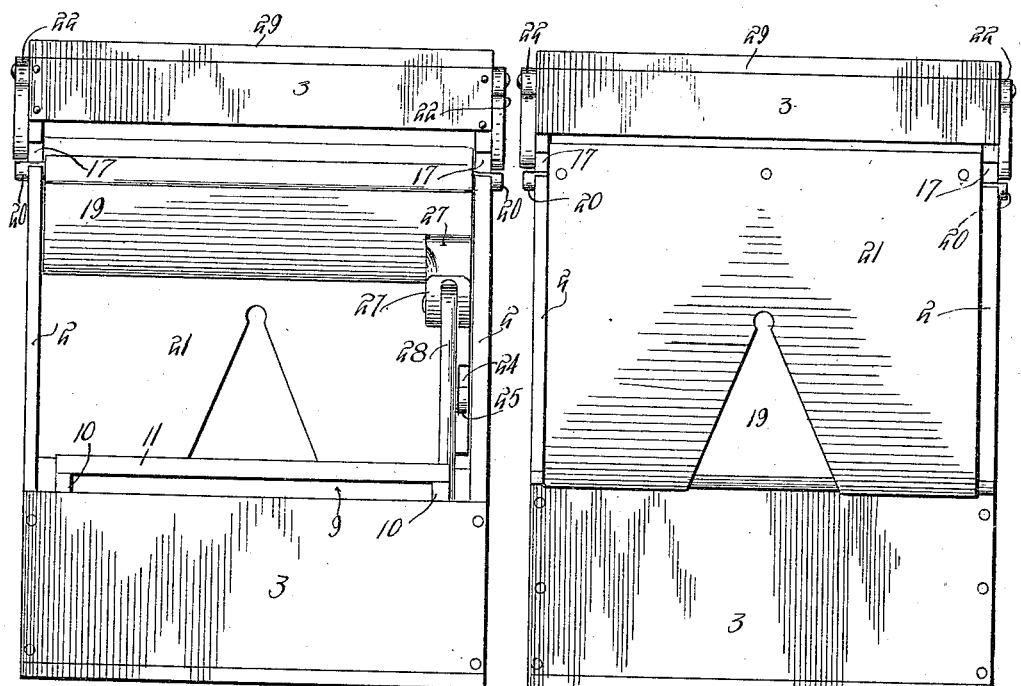

In the drawing:—Figure 1 is a top plan view with the cover removed. Fig. 2 is a front view showing the entrance opening in its set position. Fig. 3 is a rear view. Fig. 4 is a longitudinal vertical sectional view showing the trap and releasing mechanism before the entrance of the hen. Fig. 5 is a similar view showing the position of the parts after the hen has entered the nest. Fig. 6 is a detailed view showing the manner in which the doors are mounted upon the nest.

Referring to the drawings, the numeral 1 indicates a casing composed of sides 2 and narrow end sections 3, said sections acting to hold the sides 2 in spaced relation. At each lower end of the casing are suitably secured transverse sills 4.

A platform 5 is pivotally supported by the sides 2 by securing a transverse bar 6 upon the under face of said platform and at a point slightly beyond its center, said bar being provided at its opposite ends with trunnions, said trunnions being journaled in blocks 7 secured opposite each other and to the sides 2. Secured to the platform are side walls 8 and end walls 9 and when in position form the nest proper. The side walls 8 are beveled as shown at 10 in the drawings and extend slightly beyond the front end wall 9 for the purpose of supporting a shelf 11. It will be noted that the nest proper does not continue the whole length of the platform, but has one of its end walls secured at a point above the transverse supporting bar 6, thereby providing a shelf 12 upon which a counterbalance 12′ is placed. The counterbalance consists of a rectangular casing, in which the required weight may be placed. The shelf 12 has secured at its outer end a strip 13, and oppositely disposed cleats 14, under which is slidably mounted a bar 15, said bar having one of its ends provided with a reduced portion 16, the purpose of which will be hereinafter described. Thus far it will be seen that the platform when in its proper position within the casing, will assume a position as shown in Fig. 2 of the drawings and the end of the shelf 12 resting upon the front sill 4.

Formed in the opposite ends of the side walls 2 are slots 17, each of said slots having a semi-circular recess 18 formed at their inner ends. A door 19 is pivotally suspended at the entrance opening by means of trunnions 20, said trunnions being adapted to seat in the recess 18. A door 21 is suspended at the exit opening in a manner similar to that of the door 19, the trunnions of each door project slightly beyond the outer face of the side walls 2 and are held against accidental displacement by gravity latches 22. To one edge of the exit door 21 is secured an ear 23 to which is pivotally connected one end of a rod 24, said rod having its other end pivotally connected at the center to a latch 25, said latch being curved and having its upper end pivotally connected to one of the sides 2. To one of the lower corners of the entrance door 19 is secured a catch 26. Pivotally connected to one of the sides 2 and operated in conjunction with the catch 26 is a second latch member 27, said latch being pivotally connected at one of its ends to a vertical link 28. The link 28 is pivotally connected at its lower end to the reduced portion 16 of the bar 15, thereby forming a pivotal connection between the platform 5 and the latch 27. A top 29 is provided, and may be suitably secured to the nest.

It will be noted that the door 21 is provided with a V-shaped opening, through which the hen may project her neck upon the desire to leave the nest.

The operation of the device is as follows: The trap is set so that the door 19 is in its open position, and the hen may enter and pass over the counterweight and shelf 11 until the nest proper is reached, in which event the weight of the hen will cause the platform to tilt, thereby rocking the latch 27, which will allow the door 19 to swing downwardly until said latch has engaged the catch 26, and the door 19 is in its closed position. As the door swings downwardly its lower edge will ride upon the upper curved surface of the latch 25 until said door has moved a sufficient distance for its lower edge to pass the point of the latch 25 and the same engages the inner surface of the door 19, and the latch 27 and catch 26 are in engagement, the door 19 is held against accidental opening at both sides, thereby preventing a fowl in the trap from escaping or allowing another fowl to enter through the entrance opening to disturb the fowl already in the trap. When the fowl desires to leave the nest, and in the attempt to pass through the V-shaped opening the door 21 will be swung upwardly until the fowl makes its exit, during which time the rod 24 has been actuated to disengage the latch 25 from the door 19, said door will assume its open position due to the counterbalance upon the shelf 12.

From this construction it will be seen that the doors may be easily and quickly removed from their bearings for cleaning, and that by sliding the bar 15 until it is released from the link 28 the platform 5, with its nest and weight supporting shelf may be conveniently taken out for cleaning.

What is claimed, is:—

A trap nest comprising a casing having an entrance and an exit opening formed in its opposite ends, respectively, said openings extending to the opposite sides of the casing and in spaced relation from the top and the bottom thereof, doors hinged in the opposite ends of the casing and closing the entrance and exit, the said door for the entrance being normally opened when the nest is unoccupied and being automatically closed and locked in its closed position upon the entrance of a fowl, the said entrance door being hinged to swing inwardly and the exit platform including a nest and a shelf door being hinged to swing outwardly, a weighting one end thereof pivoted in the said casing intermediate its ends, a latch pivoted in said casing and engaging the entrance door, a rod connecting the latch with the weighted end of the platform and retaining the entrance door in raised position, a catch carried by the entrance door and lying in the path of the latch, a second latch pivoted within the casing and lying in the path of the entrance door, a rod connecting this second mentioned latch with the exit door and normally forcing the second mentioned latch into engagement with the entrance door by the weight of said exit door, whereby the first mentioned latch is held in engagement with the catch.

In testimony whereof, I affix my signature, in presence of two witnesses.

SAMUEL L. SMITH.

Witnesses:
　CHAS. C. TEARE,
　W. C. VINCE.

---

Copies of this patent may be obtained for five cents each, by addressing the "Commissioner of Patents, Washington, D. C."